(12) United States Patent
Barbulescu et al.

(10) Patent No.: US 9,525,987 B2
(45) Date of Patent: Dec. 20, 2016

(54) SYSTEM AND METHOD FOR FACILITATING AUDIO ACCESS TO RADIO STATIONS

(71) Applicant: Alpine Audio Now, LLC, Reston, VA (US)

(72) Inventors: Marcel Barbulescu, Falls Church, VA (US); Elan Joel Blutinger, Washington, DC (US); Eugen Leontie, Arlington, VA (US)

(73) Assignee: AudioNow IP Holdings, LLC, Wilmington, DE (US)

( * ) Notice: Subject to any disclaimer, the term of this patent is extended or adjusted under 35 U.S.C. 154(b) by 0 days.

(21) Appl. No.: 13/754,486

(22) Filed: Jan. 30, 2013

(65) Prior Publication Data

US 2014/0094152 A1    Apr. 3, 2014

Related U.S. Application Data

(60) Provisional application No. 61/708,855, filed on Oct. 2, 2012.

(51) Int. Cl.
*H04W 4/16* (2009.01)

(52) U.S. Cl.
CPC ..................... *H04W 4/16* (2013.01)

(58) Field of Classification Search
CPC .......... H04W 4/02; H04W 4/16; H04W 80/12; H04W 4/18; H04W 48/08; H04W 48/10; H04W 4/24; H04W 4/26; H04M 3/527; H04M 2207/18; H04M 3/4938; H04M 2201/60; H04L 67/04; H04H 2201/00; H04H 2201/13; H04H 2201/20; H04H 2201/183; H04H 2201/186; H04H 2201/70; H04H 60/29; H04H 60/31;H04H 60/00; H04H 40/00; H04H 20/71; H04H 20/57
See application file for complete search history.

(56) References Cited

U.S. PATENT DOCUMENTS 6,131,043 A * 10/2000 Shimizu ................ H04W 84/16
455/561
7,974,605 B2 * 7/2011 Gintz .................... H04M 3/527
370/310.2

(Continued)

FOREIGN PATENT DOCUMENTS

| EP | 0955763 A2 | * 11/1999 | ........ H04M 3/42204 |
| GB | EP0955763 | * 11/1999 | .......... H04M 3/4931 |
| WO | WO 2007090173 | 8/2007 | |

OTHER PUBLICATIONS

HIAPK (http://i.hiapk.com/news/06192013/itunes_radio_vs_pandora_vs_google_music_all_access.shtml), Jun. 19, 2013.

*Primary Examiner* — Meless Zewdu

(57) ABSTRACT

Disclosed herein are systems, methods, and non-transitory computer-readable storage media for facilitating audio access to radio stations via a call-to-listen application on a device. A server can provide a listing of radio stations via an application on a user device, such as a smartphone, receive a selection of a radio station by a user and obtain a phone number associated with the selection. The server utilizes a phone dialer on the device to dial the phone number and is presented with received audio from a radio station associated with the phone number via the device. In one embodiment, a least expensive transmission mode is determined based on a data plan balance and a voice plan balance, and the audio is presented via the determined least expensive transmission mode. In another embodiment, the phone number dialed is determined by user location.

14 Claims, 5 Drawing Sheets

(56) References Cited

U.S. PATENT DOCUMENTS

| | | |
|---|---|---|
| 8,630,899 B1 | 1/2014 | Barbulescu et al. |
| 8,788,075 B2 * | 7/2014 | Ellis .................. H04B 1/20 |
| | | 700/94 |
| 2002/0063727 A1 | 5/2002 | Markel |
| 2002/0161858 A1 * | 10/2002 | Goldman ............... H04H 60/06 |
| | | 709/219 |
| 2005/0232282 A1 * | 10/2005 | Silver .................. H04M 3/4938 |
| | | 370/401 |
| 2007/0243887 A1 | 10/2007 | Bandhole et al. |
| 2008/0057919 A1 * | 3/2008 | Choi-Grogan ........ H04W 68/02 |
| | | 455/414.1 |
| 2008/0300983 A1 | 12/2008 | Chen et al. |
| 2008/0318529 A1 | 12/2008 | Harb |
| 2010/0027426 A1 * | 2/2010 | Nair ..................... H04W 28/16 |
| | | 370/238 |
| 2011/0081953 A1 * | 4/2011 | Higuchi ................ G06F 3/0481 |
| | | 455/566 |
| 2011/0267985 A1 | 11/2011 | Wilkinson et al. |
| 2012/0108266 A1 * | 5/2012 | Clark ..................... H04W 4/02 |
| | | 455/456.3 |
| 2012/0170726 A1 | 7/2012 | Schwartz |

* cited by examiner

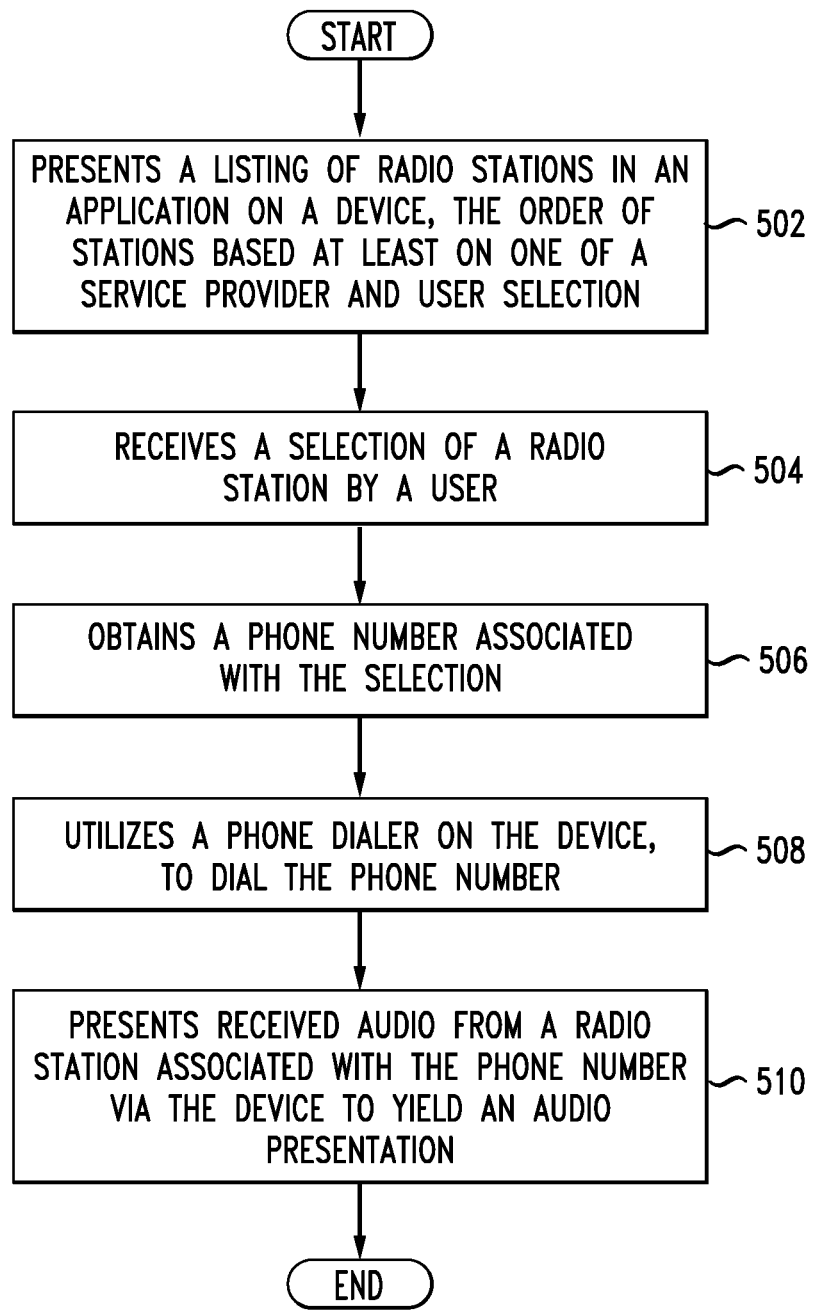

SYSTEM AND METHOD FOR FACILITATING AUDIO ACCESS TO RADIO STATIONS

PRIORITY

This application claims priority to U.S. Provisional Patent Application No. 61/708,855 filed on 2 Oct. 2012, which is herein incorporated by reference in its entirety.

BACKGROUND

1. Technical Field

The present disclosure relates to facilitating audio access to radio stations and more specifically to delivering audio via a user's wireless voice plan associated with a service provider.

2. Introduction

Users of mobile devices such as smartphones use their devices for many different applications including sending and receiving phone calls, text messages, and email and for other applications such as listening to music and watching videos. Smartphone users subscribe to varying levels of service provided by service providers including wireless voice plans, data plans and texting plans based on their level of consumption. Receiving streaming content such as radio and video via a mobile device causes a user to consume large amounts of data. Mobile service providers are capitalizing on users consuming large amounts of data through data plans, by continually increasing the cost of sending and receiving data via mobile devices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for facilitating audio access radio stations utilizing a user's wireless voice plan with a service provider instead of a data plan. An application on a user's device allows the user to organize and listen to radio stations without stretching the limits of a wireless data plan. A system implementing the method presents a listing of radio stations in an application on a device and receives a selection by a user of a radio station from the listing of radio stations at a server. The server obtains a phone number associated with the selection and utilizes a phone dialer on the device to dial the phone number. In one embodiment, the system can obtain the phone number by allocating at least two phone numbers in different states for each radio station in the listing of radio stations and determines the phone number to dial from the two phone numbers provided based on a location of the user. The location of the user can be determined by user phone number, a location based service and user input, for example. The user is presented with received audio from a radio station associated with the phone number via the device. Received audio can include a radio broadcast, a news broadcast, a television broadcast and a podcast. The system can make a copy of the streaming radio data and utilize the copy for the particular user via the application, enabling the user to listen to his own copy of the radio program. The user can control whether the live broadcast is presented for listening immediately or can direct the system to record the program for later use by the user. Further, the system can present in full or in part and on a dynamic basis a time compressed version of the audio program. For example, if a pause occurs in a radio program, the system can resume playing the program using a compressed version of the program when it resumes such that over time, the listener will return to "real-time" listening. Compressed audio typically means audio compressed in time such that it is playing faster. The listing of radio stations provided to the user through the application can be based on audience demographics and information collected from the device, and the order of the listing of radio stations can be based on one of a user selection and a service provider selection. Information collected from the device can include a phone number associated with the device, location based information and contact information. In one embodiment, the server can provide a listing of news feeds based on audience demographics, such as providing Haitian news for listeners enjoying Haitian broadcasts.

The application can analyze a user account associated with the device and the service provider to collect information such as type of mobile device plan, voice plan balance and data plan balance. The application can determine a least expensive transmission mode for delivering a radio broadcast utilizing the voice plan balance and data plan balance and can present received audio from a radio station via the device utilizing the least expensive transmission mode. In one embodiment, the transmission mode can be selected by the service provider or the user and the transmission mode can change during the audio presentation. For example, a user can listen to a selected radio station via the user's voice plan and the system can determine that the voice plan balance is low, and can seamlessly switch to the data plan in order to provide uninterrupted service to the user at a lower cost than using the data plan for the entire radio broadcast.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for facilitating audio access to streaming media in a more cost effective way. Traditionally, streaming media has been provided to a user's device using a wireless data plan subscribed to by the user on a monthly or yearly basis. Unlimited wireless data plans can be costly, and for some users limited wireless data plans make more sense. For users having a limited wireless data plan, receiving streaming media can be cost prohibitive.

A system, method and non-transitory computer-readable media are disclosed which facilitate audio access to radio by utilizing a user's wireless voice plan with a service provider instead of a data plan. A brief introductory description of a basic general purpose system or computing device in FIG. 1 which can be employed to practice the concepts is disclosed herein. A more detailed description of audio facilitation will then follow. The disclosure now turns to FIG. 1.

Figure 1:
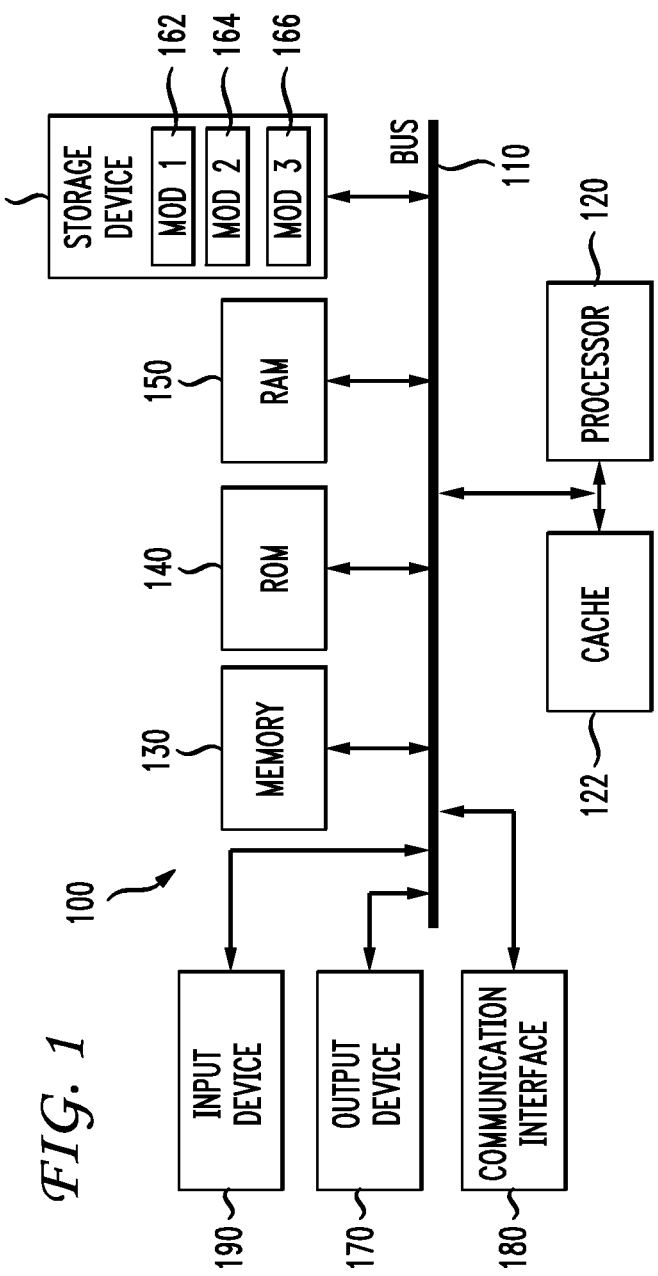
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
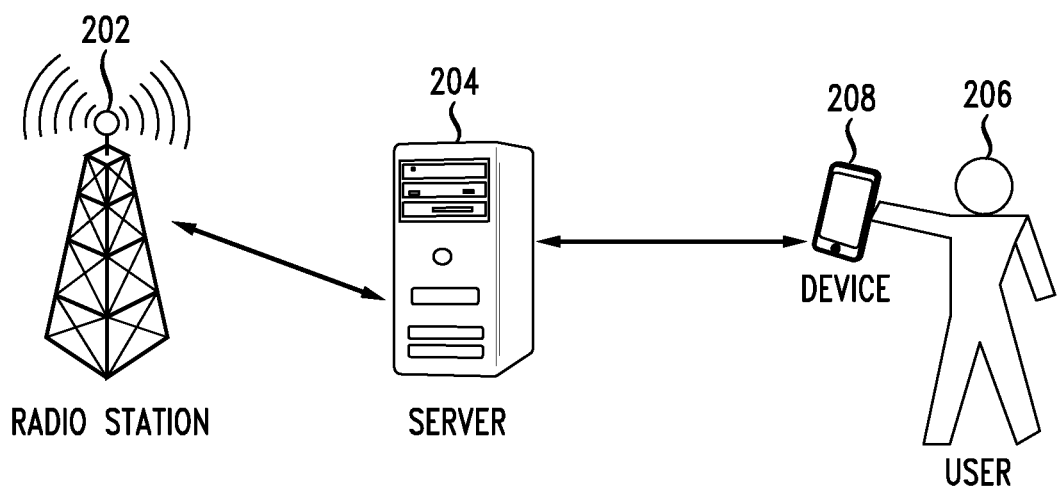
FIG. 2 illustrates an example audio access system embodiment.

Having disclosed some components of a computing system, the disclosure now turns to FIG. 2, which illustrates an exemplary system for facilitating audio access to radio broadcasts via an application on a user device. A user 206 can request a listing of radio stations available via an application that communicates with a server 204 on a user device 208 such as a smartphone. The server can process requests sent by the application from the user device and can furnish information to the user device sent by a radio station 202. The radio station 202 can receive requests by the server 204 and can provide user selected streaming radio to the server, which delivers the streaming radio content to the user device for listening by the user. In one aspect, the system makes a copy of the streaming radio data and utilizes the copy for a specific user or application, enabling the user to control listening to his own copy of the radio program. The user can listen to the live radio broadcast or the user can control the application to record the live broadcast for use by the user at a later time.

In one example, when the listener is listening to a live broadcast, the system may present the audio in a compressed version, i.e., compressed in time such that it is sped up. One example of when such an approach would be desirable would be if the system inserts a 2 minute advertisement into the program. After the advertisement, when the (now two minute delayed) program resumes, if it plays out at the standard pace, then it would end to minutes later than the live version. However, the system can resume playback at a compressed rate which can be timed such that its time compression dynamically changes such that the delay program ends at the same time that the live program, without the delay, would end. Thus, for example, the system could resume playing the program after the commercial at a 2× compression in time, and 5 minutes later, the system may adjust to be at a 1.5× compression in time, until at some point, the system is back to real time playback in sync with the live program. The compression could be presented in such a way that the listener barely notices a chance in the audio.

The system described in FIG. 2 can deliver any type of audio content including live radio, television and news broadcasts and pre-recorded programs such as podcasts. The server 204 can process requests by one or more user devices such as five or ten and can process requests and responses from one or more radio stations. The system described in FIG. 2 is purely exemplary and any network configuration utilizing a radio station, server, user and user device capable of making and receiving phone calls utilizing an application is contemplated.

Figure 3:
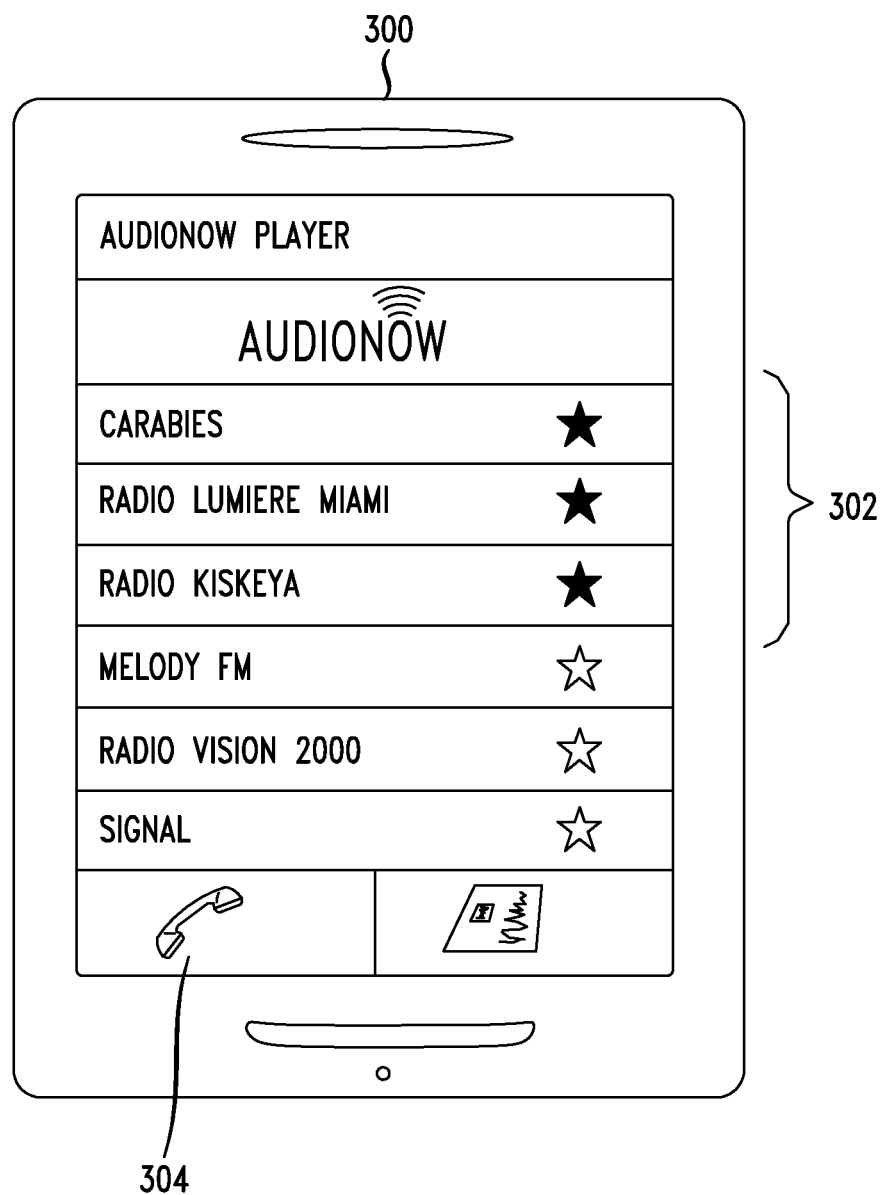
FIG. 3 illustrates an exemplary application screenshot.

FIG. 3 illustrates an exemplary radio listing screenshot 300 provided to the user 206 via the user device 208 by the application. The radio listing can include a list of available radio streams for selection by the user. For example, radio stations such as Carabies, Radio Lumiere Miami and Radio Kiskeya 302 are provided at the top of the radio station listing in FIG. 3. The order of the radio stations in the listing can be based on user preferences, for example a user favorites list or can be determined by the application or server. A user can designate a radio station as a favorite and the application can display user-selected favorites at the top of the list because those stations are most frequently selected by the user. The user can share one or more radio stations with friends, and can contact the developers of the application to recommend adding specific radio stations to the listing of radio stations. The listing of radio stations can be based on audience demographics. For example, the application can display available Haitian radio stations for a user known to enjoy listening to Haitian radio stations. Alternately, the application can display alternative music stations for a user known to enjoy listening to the band R.E.M. The listing of radio stations can also be based on information collected from the user's device. For example, the listing can be based on caller phone number, caller location as determined automatically via GPS or input by the user and caller contact list. Third party services can supply demographic information based on caller phone number, collected from calling card companies, for example. The application can suggest radio stations that are listened to most frequently by callers on the caller contact list and based on radio stations previously listened to by the user. For example, when a new gospel radio station airs, the application can suggest the new station to a user known to enjoy listening to gospel radio programs. The application can personalize radio stations for a user based on actual user location which can be determined using GPS on the device or can be input by the user. For example, when a user is vacationing in Hawaii, the application can automatically determine the user's location to be Hawaii and can personalize the listing of radio stations based on that location. Hawaiian radio stations and newsfeeds, for example can be provided in the listing for selection by the user. When the user returns home, the application can provide the typical listing of radio stations for that location. The application can personalize the listing based on a combination of user phone number and their actual location, when the user allows the application to access their physical location. In one aspect, the application provides local radio stations lower on the listing of available stations because the local stations are likely available via radio available through a sound system in a car, for example, when driving in a particular area. The concept of personalizing the listing of radio stations applies to a listing of newsfeeds or television shows, for example. Users can receive personalized news based on their phone number, location, or a combination of both. In one aspect, the customizations are such that stations are shown in a particular order, or some stations are not shown at all depending on user preferences.

Next, the user 206 can select a radio station and select the "call" button on the device 304 to call a phone number associated with the radio station. The server can retrieve a phone number associated with the selected radio station and can provide the application with the phone number for dialing. When the call is connected to the radio station, the application presents received audio from a radio station associated with the phone number to the user for listening using the calling feature on the phone instead of receiving streaming radio via a data connection that consumes large amounts of data for a user having a wireless data plan. In one embodiment, the phone number associated with the radio station is obtained by allocating at least two phone numbers associated with different states for each radio station in the listing of radio stations, and determining the phone number to call based on a phone number associated with the user's device. The phone number associated with the user's device can be automatically determined by retrieving user account information stored by the service provider or by retrieving the number stored on the device.

Figure 4:
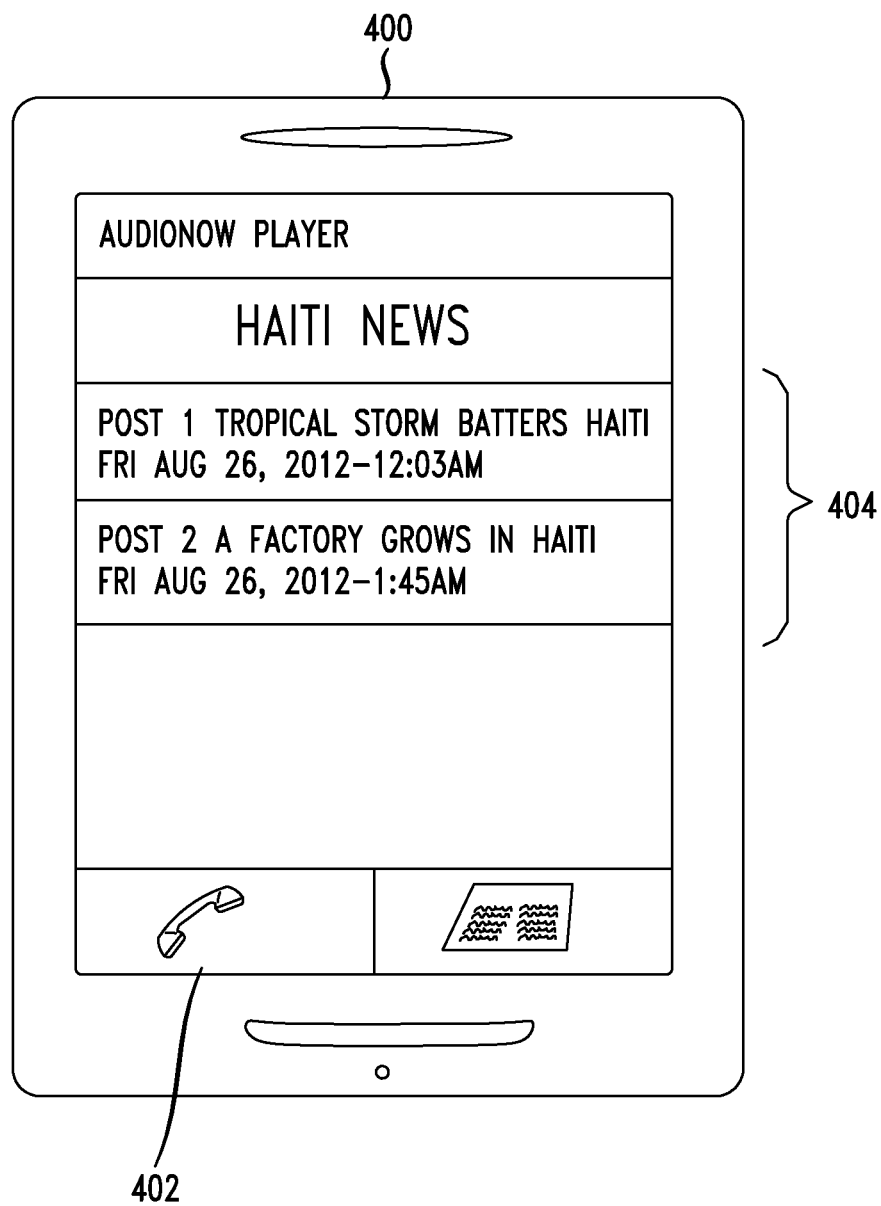
FIG. 4 illustrates an exemplary application screenshot.

FIG. 4 illustrates an exemplary newsfeed listing screenshot 400. In one embodiment of the disclosure, a selection of news feeds 404 is provided to the user 206 by the application on the device. The listing of news feeds can be based on audience demographics or user preferences. For example, the listing can include Haitian news headlines for a user known to enjoy listening to Haitian news or radio. The user can select a newsfeed and select the "call" button 402 on the user device to call a phone number associated with the selected news feed. When the call is connected, the application provides an audio presentation of the selected news feed via the calling feature on the phone instead of receiving streaming news via a data connection. In one embodiment, the application can display the news article associated with the selected newsfeed on the user device such that the user can read along with the news broadcast. The application is capable of delivering any type of audio information such as live radio, news and television broadcasts and pre-recorded programs such as podcasts. For example, the application can provide a listing of current live television broadcasts available for listening by the user. The listing of live television broadcasts can be based on audience demographics, user preferences or can be randomly generated. Any ordering of available broadcasts for selection by the user is contemplated.

The application on the user device 208 can analyze a user account associated with the device and a service provider and use the information to determine how to deliver audio content. The user account can include such information as user name, phone number, address, preferences, type of wireless plans and balances of wireless plans. For example, the application can determine based on analysis of the user account that a user has a prepaid cell phone plan for voice calls with a monthly data charge of $20 for data usage. The application can determine that a particular user has 350 calling minutes that must be consumed by the user with three months and has a balance of 400 MB of data that expires in 20 days. Using account balance information, the application can determine an audio content delivery mechanism. The application can determine a least expensive transmission mode for presenting a radio program using a data plan balance and a voice plan balance with a service provider, and present the radio program using the least expensive mode. For example, if a user having a balance of 10 calling minutes calls in to a radio station utilizing the application, the application can use the remaining 10 calling minutes and can automatically transfer delivery of the radio stream from voice to data so that the user does not lose the connection when his minutes run out. In one embodiment, the application can provide the account balance information to the user upon selection of a radio station, or during initialization of the application for user selection. Optionally, the application may send a notification to the user when account balances reach a threshold so the user is aware that possible data charges may apply. In another embodiment, a user may opt to listen to a radio program or other broadcast using his wireless data plan through the application due to a data plan providing higher data quality.

Having disclosed some basic system components and concepts, the disclosure now turns to the exemplary method embodiment shown in FIG. 5. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. The system presents a listing of radio stations in an application on a device, the order of stations based at least on one of a service provider and a user selection (502) and receives a selection of a radio station by a user (504). The system obtains a phone number associated with the selection (506) and utilizes a phone dialer on the device, to dial the phone number (508). Then the system presents received audio from a radio station associated with the phone number via the device to yield an audio presentation (510). The audio presentation can include any type of audio such as radio, television and news broadcasts and can include prerecorded programs such as podcasts. Portions of the audio presentation can be presented in whole or in part in a time compressed format depending on pauses for commercials or other reasons. Such time compression can be for a portion of the program during which the program may be catching up (i.e., playing faster) such that it eventually returns to real time.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method:
presenting a listing of radio stations in an application on a device, wherein an order of the listing of radio stations is based on at least one of a service provider and a user selection;
receiving a selection by a user of a radio station from the listing of radio stations;
analyzing a user account associated with the device and the service provider, wherein the user account comprises a data plan balance and a voice plan balance;
determining a least expensive transmission mode utilizing the at least one of the data plan balance and the voice plan balance, the least expensive transmission mode comprising one of a data mode and a voice mode;
presenting received audio from a radio station via the device utilizing the least expensive transmission mode, wherein presenting the received audio via the voice mode comprises:
obtaining a 10 digit phone number associated with the selection;
utilizing a phone dialer on the device, dialing the 10 digit phone number to yield a telephone connection associated with the radio station, the dialing being performed automatically without the user dialing numbers of the 10 digit phone number; and
presenting received audio associated with a broadcast program from the radio station via the telephone connection; and
presenting a notification when a threshold associated with the least expensive transmission mode is met informing the user of data charges associated with continued use of the least expensive transmission mode.

2. The method of claim 1, wherein the listing of radio stations is based on at least one of audience demographics and information collected from the device.

3. The method of claim 2, wherein information collected from the device comprises at least one of a phone number associated with the device, location based information and contact information.

4. The method of claim 2, further comprising presenting a listing of news feeds based on audience demographics.

5. The method of claim 1, wherein use of the least expensive transmission mode is determined by the user.

6. The method of claim 1, wherein the least expensive transmission mode changes during the presentation of the received audio upon encountering the threshold.

7. The method of claim 1, wherein the received audio is one of a radio broadcast, a news broadcast, a podcast and an audio portion of a television broadcast.

8. The method of claim 1, wherein obtaining the 10 digit phone number associated with the selection further comprises:
allocating at least two phone numbers for each radio station in the listing of radio stations; and
determining the 10 digit phone number from the at least two phone numbers based on a phone number associated with the device.

9. The method of claim 8, wherein each of the at least two phone numbers are associated with different states.

10. A system comprising:
a processor; and
a non-transitory computer-readable storage medium storing instructions which, when executed by the processor, perform operations comprising:
presenting a listing of radio stations in an application on a device, wherein an order of the listing of radio stations is based on at least one of a service provider and a user selection;
receiving a selection by a user of a radio station from the listing of radio stations;
analyzing a user account associated with the device and the service provider, wherein the user account comprises a data plan balance and a voice plan balance;
determining a least expensive transmission mode utilizing the at least one of the data plan balance and the voice plan balance, the least expensive transmission mode comprising one of a data mode and a voice mode;
presenting received audio from a radio station via the device utilizing the least expensive transmission mode, wherein presenting the received audio via the voice mode comprises:
obtaining a 10 digit phone number associated with the selection;
utilizing a phone dialer on the device, dialing the 10 digit phone number to yield a telephone connection associated with the radio station, the dialing being performed automatically without the user dialing numbers of the 10 digit phone number; and
presenting received audio associated with a broadcast program from the radio station via the telephone connection; and
presenting a notification when a threshold associated with the least expensive transmission mode is met informing the user of data charges associated with continued use of the least expensive transmission mode.

11. The system of claim 10, wherein the listing of radio stations is based on at least one of audience demographics and information collected from the device.

12. The system of claim 11, wherein information collected from the device comprises at least one of a phone number associated with the device, location based information and contact information.

13. A non-transitory computer-readable storage medium storing instructions which, when executed by a computing device, cause the computing device perform operations comprising:
presenting a listing of radio stations in an application on a device, wherein an order of the listing of radio stations is based on at least one of a service provider and a user selection;

receiving a selection by a user of a radio station from the listing of radio stations;

analyzing a user account associated with the device and the service provider, wherein the user account comprises a data plan balance and a voice plan balance;

determining a least expensive transmission mode utilizing the at least one of the data plan balance and the voice plan balance, the least expensive transmission mode comprising one of a data mode and a voice mode;

presenting received audio from a radio station via the device utilizing the least expensive transmission mode, wherein presenting the received audio via the voice mode comprises:

obtaining a 10 digit phone number associated with the selection;

utilizing a phone dialer on the device, dialing the 10 digit phone number to yield a telephone connection associated with the radio station, the dialing being performed automatically without the user dialing numbers of the 10 digit phone number; and presenting received audio associated with a broadcast program from the radio station via the telephone connection; and presenting a notification when a threshold associated with the least expensive transmission mode is met informing the user of data charges associated with continued use of the least expensive transmission mode.

14. The non-transitory computer-readable storage medium of claim 13, wherein, the non-transitory computer-readable storage medium storing additional instructions which, when executed by the computing device, cause the computing device to perform operations further comprising:

allocating at least two phone numbers for each radio station in the listing of radio stations; and determining the 10 digit phone number from the at least two phone numbers based on a phone number associated with the device.

* * * * *